Aug. 20, 1946.　　　E. A. PACKARD　　　2,406,248
LIQUID SOLIDS SEPARATION APPARATUS
Original Filed Feb. 14, 1942　　6 Sheets-Sheet 1

INVENTOR
Edwin A. Packard

Aug. 20, 1946.     E. A. PACKARD     2,406,248
LIQUID SOLIDS SEPARATION APPARATUS
Original Filed Feb. 14, 1942     6 Sheets-Sheet 2

INVENTOR
Edwin A. Packard

Aug. 20, 1946.  E. A. PACKARD  2,406,248
LIQUID SOLIDS SEPARATION APPARATUS
Original Filed Feb. 14, 1942  6 Sheets-Sheet 4
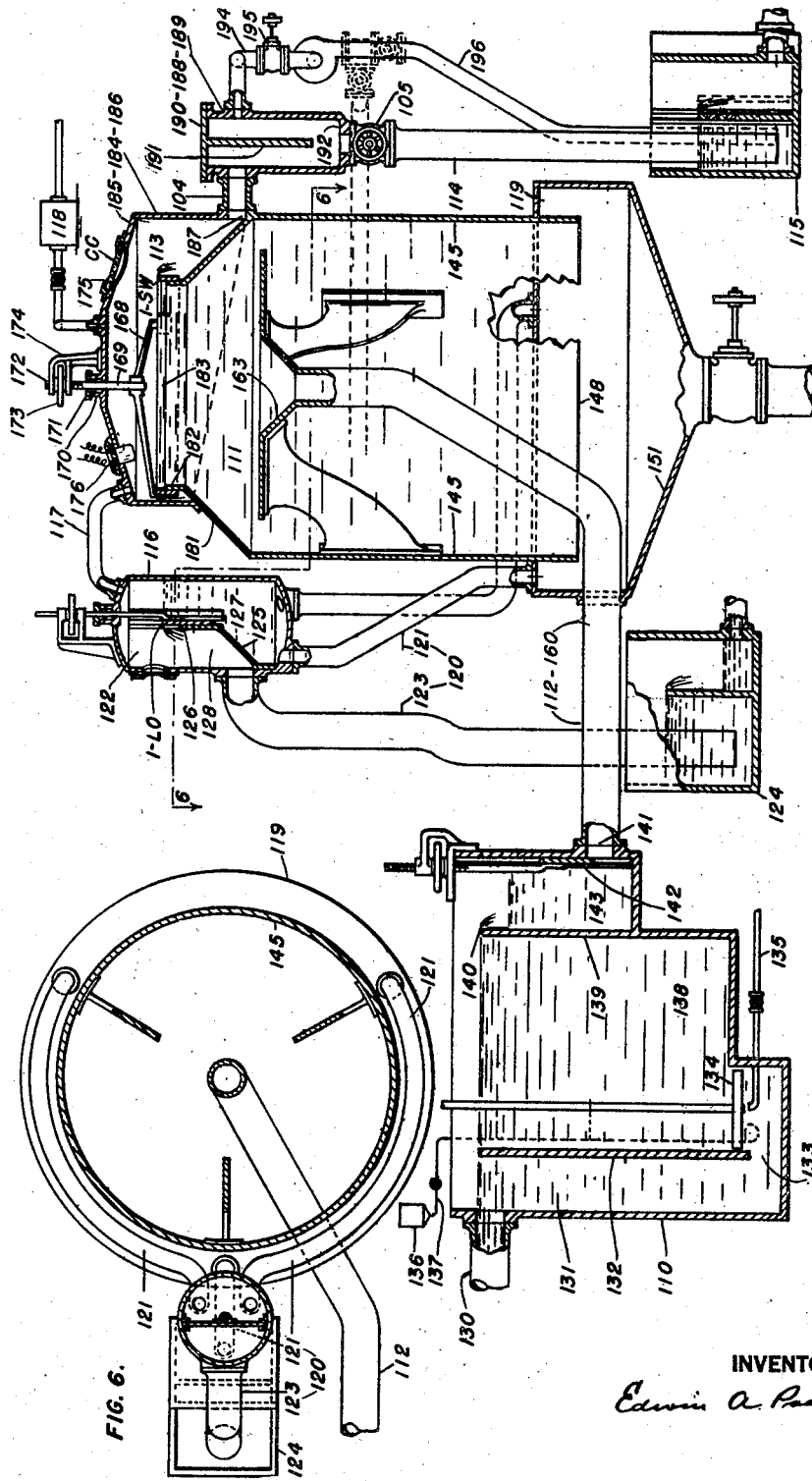
INVENTOR
Edwin A. Packard

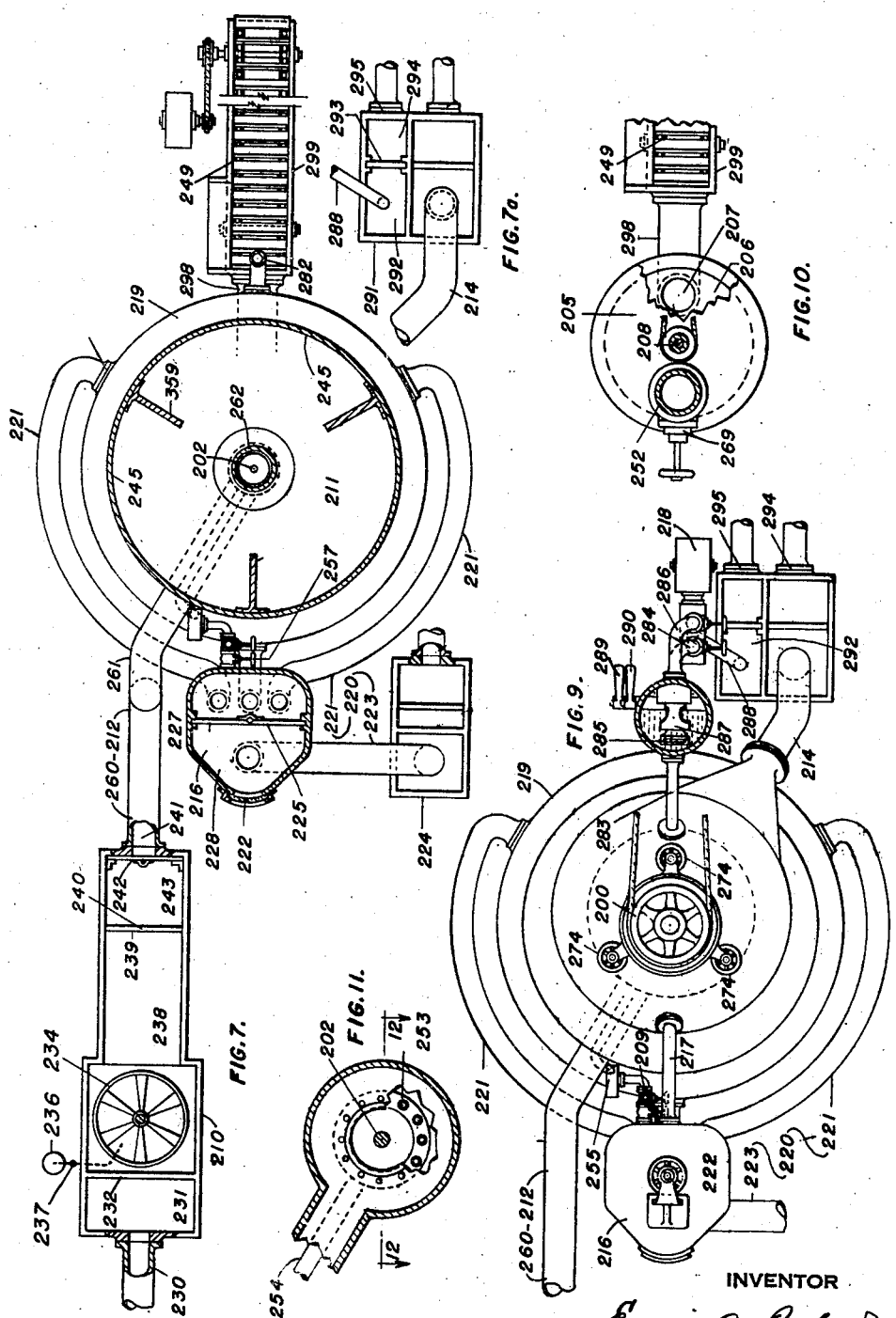

Aug. 20, 1946.  E. A. PACKARD  2,406,248
LIQUID SOLIDS SEPARATION APPARATUS
Original Filed Feb. 14, 1942   6 Sheets-Sheet 6
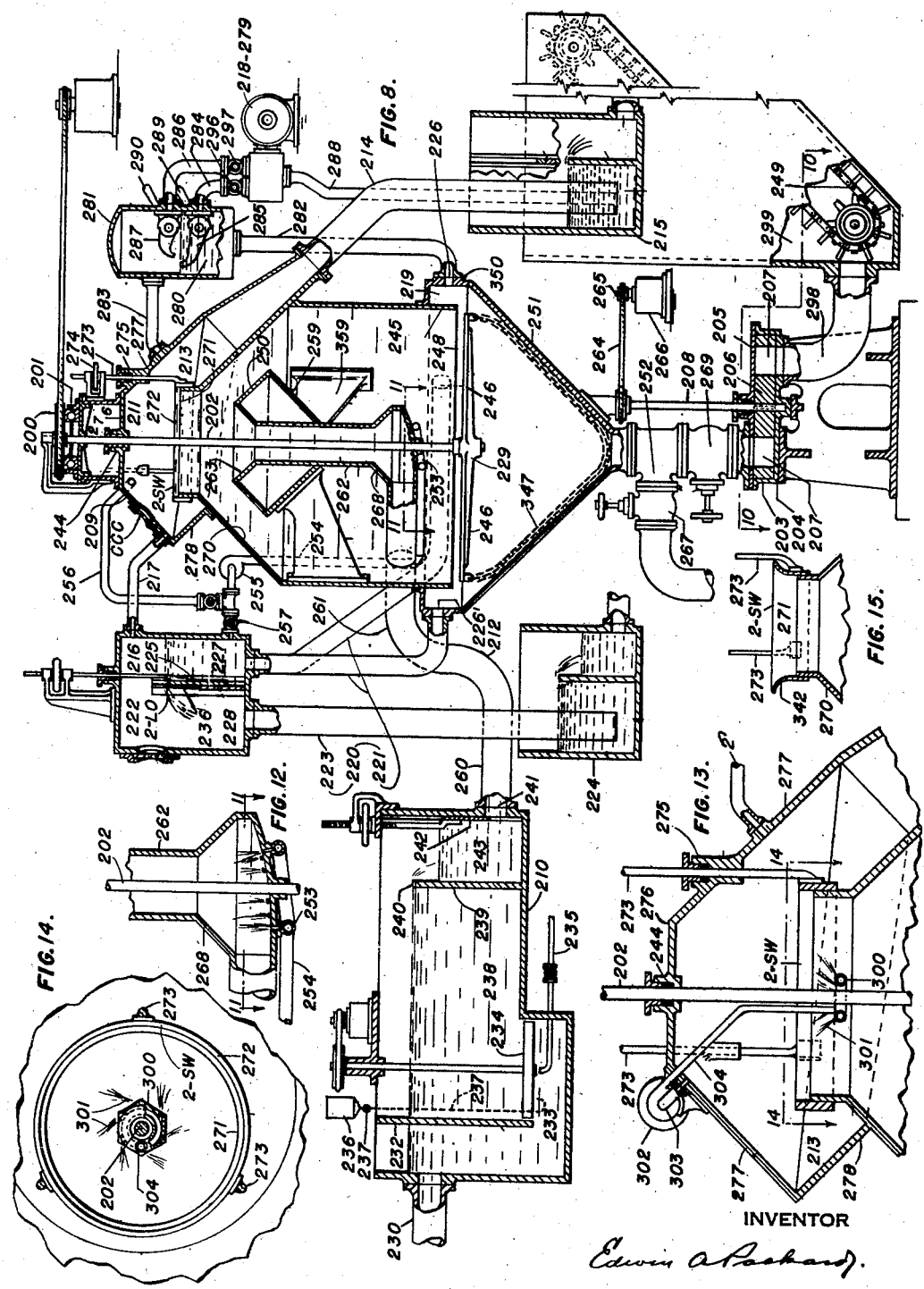
INVENTOR
Edwin A. Packard Patented Aug. 20, 1946

2,406,248

UNITED STATES PATENT OFFICE 2,406,248

LIQUID SOLIDS SEPARATION APPARATUS

Edwin A. Packard, Yonkers, N. Y.

Substituted for abandoned application Serial No. 430,972, February 14, 1942. This application December 3, 1943, Serial No. 512,684

28 Claims. (Cl. 210—55)

The invention relates to the separating of solid particles from the liquid of a suspension in which they are carried.

Many types of suspended matter can be caused to float on the top of liquid containing the same when such liquid suspension is transferred from a locality whereat it was exposed to normal atmospheric pressure to a closed container wherein it is combined with liquid undergoing treatment in the container and exposed to overlying air or other gas which is continued at pressure substantially subatmospheric.

The invention hereof has in view as a broad aspect thereof a novel process, and a novel apparatus for performing the process, according to which there is involved the exposing of a confined continually fed ever-changing body of such liquid suspension to overlying gas maintained at pressures substantially sub-atmospheric whereby the suspended solids readily rise as a float, scum, or froth, on the surface of the liquid, the transferring and delivering of a controlled quantity of scum or froth as an overflow float-fraction leaving the confined body along one path, and the upwardly-transferring, overflowing and ultimate releasing of a controlled quantity of clarified liquid as an outflowing liquid-fraction along a second path, namely, along a path leading from a lower or intermediate portion of the confined body.

The invention, according to a more specific aspect thereof, extends into a situation wherein there is provided within or for the lower portion of said confined body a zone of relative quiescence favorable to the settling of heavy solids as a sediment and to the collecting and progressively transferring of said sediment as a heavy solid fraction along a third path, namely, along a third path leading from the lowermost portion of said confined body. In the instance of this more specific aspect of the invention, the reduction in pressure of the sub-atmospheric pressure gas is not sufficient for the effects thereof to reach, or extend downwardly into the quiescent lower zone thereby avoiding any functional influence of the reduced pressure gas on the liquid in that zone and more specifically avoiding turbulent conditions which might otherwise exist if the functional effects of the vacuum or reduced pressure reached down into said lower zone.

Important phases or aspects of the invention revolve about the features of construction of a novel closed tank or vacuum type of unit into which the liquid suspension is continually fed to a confined ever-changing body of such liquid suspension that is overlain and exposed to gas at substantially sub-atmospheric pressures, within which tank there is a transfer of a controlled quantity of froth, scum or other float material—herein broadly referred to as scum—from the top of the liquid body and a delivery of the transferred scum as a float-fraction to a locality outside of the tank without permitting the entrance of outside air into the tank, an upward transfer of clarified liquid from a lower or intermediate portion of said body to and past a high section or overflow weir which in effect regulates the relative quantity of overflow clarified liquid as compared with the scum transfer heretofore referred to and the subsequent delivery of overflowed clarified liquid to a locality outside of the tank without permitting the entrance of outside air into the tank.

According to a more specific phase or aspect of the invention, it extends to such a closed tank or vacuum type of unit in which provision is made for a quiescent sedimentation section within the lowermost portion of the tank and for such unit there is also provided means for collecting and transferring sedimented solids as a third fraction from the lower interior portion of the tank without permitting the entrance of air into the tank and in a manner to effect such transfer of the third fraction without substantially effecting the general level of the liquid within the tank.

The different features and aspects of the invention will be manifest and more fully appreciated from the following portion of the specification and the accompanying drawings which constitute a part of the specification.

In the drawings:

Fig. 5 is a vertical view, mostly in section, of another form of apparatus.

Fig. 6 is a horizontal sectional view taken as on the horizontal planes indicated by the broken line 6—6 of Fig. 5 looking in the direction of the arrows.

Fig. 7 is a horizontal view, some in plan and some in horizontal section of another form of the apparatus.

Figure 1:
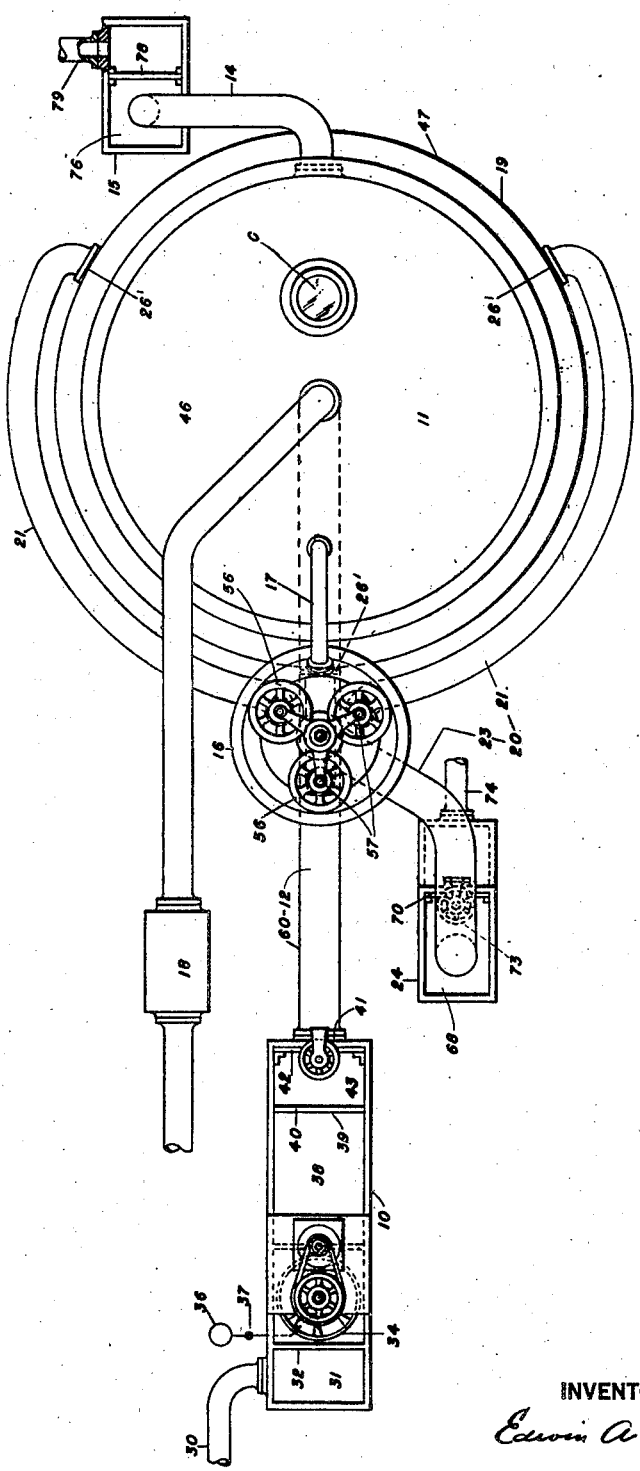
Fig. 1 is a plan view partly in section.

Fig. 7ᵃ is in reality a part of the horizontal view of Fig. 7 but since it may appear to be detached from Fig. 7, it has been designated as Fig. 7a.

Fig. 8 is a vertical view, mostly in section, of the apparatus of Fig. 7.

Fig. 9 is a plan view, partially in section, of a portion of the apparatus shown in Figs. 7 and 8.

Fig. 10 is a horizontal view, partially in section and partially broken away; it is a view taken as on the horizontal planes indicated by the line 10—10 of Fig. 8 looking in the direction of the arrows.

Figs. 11 and 12 are respectively a horizontal sectional and a vertical view of a detail of the feed-conduit or a draft tube construction employed in the apparatus of Figs. 7 and 8, Fig. 11 being a horizontal view taken as on the plane indicated by the line 11—11 in Figs. 8 and 12, and Fig. 12 being a vertical sectional view taken as on the line of 12—12 of Fig. 11 looking in the direction of the arrows.

Fig. 13 is a vertical sectional view of a detail of construction which may be employed at and for the top of the tank shown in Fig. 8.

Fig. 14 is a horizontal sectional view taken as on the horizontal planes indicated by the line 14—14 of Fig. 13 looking in the direction of the arrows.

Fig. 15 is a vertical sectional detail view of a feature of construction which can be employed in and for the upper throat member of the tank shown in Fig. 8.

In the drawings like parts have been given like reference characters. Certain features or operative parts that are common to each of the forms illustrated will first be referred to.

Each form of apparatus includes or embodies as an associated part thereof a feed-receiving and initial treating basin 10, 110 or 210; a closed tank 11, 111 or 211, providing a main separating compartment wherein there is held an ever-changing body of liquid suspension that is immediately overlain by and exposed to gas maintained at pressures substantially below that of the pressure of the atmosphere outside of the tank; a feed-delivery conduit in the form of a draft tube 12, 112 or 212 leading from the basin and terminating in an upflow discharge section which submergedly delivers the incoming liquid suspension into said ever-changing liquid body; means providing a scum or froth-receiving launder 13, 113 or 213 having an overflow weir or overpass transfer edge SW, 1SW or 2SW over which floating scum passes from the top of said body into said launder; means for passing the scum, froth, or other floating material from the scum launder to a locality outside of the tank without permitting the ingress of outside air into the tank, namely, by scum outflow means provided by a downflow pipe or conduit in the form of a barometric leg 14, 114 or 214 the lower end of which continuously dips into a body of scum or liquid within a low scum-release box 15, 115 or 215, identifiable as a scum collector; an auxiliary tank or liquid-height control structure 16, 116 or 216 providing a liquid-receiving and gas-holding compartment or space 22, 122 or 222 extending to elevation substantially higher than that and to elevation substantially lower than that of the scum-transfer weir SW, 1SW or 2SW; a pipe or other passageway providing means 17, 117 or 217 for insuring constant communication between the upper interior portion of the auxiliary compartment 22, 122 or 222 and the upper interior portion of the main tank 11, 111 or 211 whereby the pressure of the gas within the main tank and the pressure of the gas within the auxiliary compartment will always continue substantially alike, to wit, at like pressures always substantially less than that of the pressure of the air outside of the apparatus; pump means 18, 118 or 218 for withdrawing air or other gas from the gas-holding portions of said tank and the auxiliary structure associated therewith and for thereby maintaining the pressure of the gas therein substantially sub-atmospheric; means for receiving clarified liquid passing thereinto from a lower or intermediate portion of the liquid body, to wit, means in the form of a bustle-collecting section 19, 119 or 219 located along an intermediate or lower portion of the tank 11, 111 or 211; and clarified-liquid transfer means 20, 120 or 220 embodying upflow pipes or conduits 21, 121 or 221 leading from the bustle section upwardly to the lower interior portion of the auxiliary tank or liquid-height control structure 16, 116 or 216, means providing a high liquid-fraction overflow weir or dam LO, 1LO or 2LO past which any outflowing clarified liquid must pass before delivery as overflowed liquid into the chamber or compartment 22, 122 or 222 of the auxiliary structure 16, 116 or 216, and a downflow pipe or conduit 23, 123 or 223 in the form of a barometric leg extending from the lower portion of said compartments downwardly to and into a low clarified-liquid release box or tank 24, 124 or 224—identifiable as an effluent-receiver—holding a body or pool of clarified liquid into which the low end of the barometric leg constantly dips and by which it is liquid-sealed against the inflow of outside air. The intake end 41, 141 or 241 of the feed supply pipe or draft tube 12, 112 or 212 is in submergence whereby it is always liquid-sealed against the entrance of outside air therethrough into the tank 11, 111 or 211. Because of this fact and also since the barometric leg sections already referred to are liquid-sealed, the structure of the apparatus is such that the separation tank 11, 111 or 211 is constantly sealed against the entrance of outside air thereinto during the normal functioning thereof.

*Feed receiving basin 10, 110 or 210*

Incoming liquid suspensions are delivered by the pipe 30, 130 or 230 into an initial feed-receiving section 31, 131, or 231 of the basin 10, 110, or 210, to wit, at a locality thereof in front of the partial partition 32, 132 or 232. The fed material passes from this section 31, 131 or 231 through an underpass space 33, 133 or 233 left below the partial partition 32, 132 or 232 into a region whereat it comes under the operative influence of a gas-diffusing member in the form of a rotatable impelling means 34, 134 or 234. Air or other selected gas is supplied through a valve-controlled pipe 35, 135 or 235. Under the operative influence of this impelling means the air or other gas is intimately mixed and diffused within and throughout the liquid passing said agitating or impelling means.

In the treating of certain liquid suspensions, it is advisable to add a frothing agent, flotation oil, or other chemical reagent and for such purpose there is indicated and provided a holder 36, 136 or 236. A valve-controlled pipe 37, 137 or 237 is also indicated as means by which the contents of said holder 36, 136 or 236 may be delivered into the liquid suspension so as to come under the operative influence of the impelling member 34, 134 or 234 as it functions. A relatively large region is provided within the basin at 38, 138 or 238 to permit the escape of large gas bubbles which may remain in the liquid suspension. In order to insure sufficient retention for the liquid in the section 38, 138 or 238, there is provided within the basin an upstanding partition or dam 39, 139 or 239 the upper edge 40, 140 or 240 of which determines the minimum level of the liquid in the basin. The surface level of the overflowed liquid in the receiving section 43, 143 or 243 therefor is generally at elevation within a range including an elevation somewhat lower than that of the overflow weir 40, 140 or 240, and an elevation higher than the intake end 41, 141 or 241 of the draft tube 12, 112 or 212 whereby the intake end of the latter always continues in submergence. An adjustable gate 42, 142 or 242 is provided so as to regulate the area of the entrance of the intake end 41, 141 or 241 of the draft tube or even to completely shut off the intake opening thereof at the will of an operator. From the foregoing it will be noted that the features of construction just described with regard to the feed-receiving and initial treating basins apply to each form shown.

The construction and functioning of the basin 10, 110 or 210 has been described in order that one may readily appreciate any pre-treatment operations on the liquid suspensions and the steps employed respecting the supplying of the same to the separation tank 11, 111 or 211 wherein the liquid suspensions are further treated and handled in such manner as to obtain or effect the removal of certain suspended solids as froth, scum or other type of float fraction—each and all identifiable as scum thus used herein as a generic term—which flows outwardly along one path involving its passage over the transfer weir SW, 1SW or 2SW into the scum-receiving launder 13, 113 or 213, and the removal of a clarified liquid-fraction along another path involving its passage from a lower or intermediate portion of the tank upwardly towards and past a high liquid-fraction overflow weir or dam LO, 1LO or 2LO that regulates the minimum elevation for the surface level of the liquid maintained within the tank and its passage as overflowed effluent into chamber 22, 122 or 222 and thence downwardly through the liquid-sealed barometric leg section before release to the atmosphere.

Figures 2, 3:
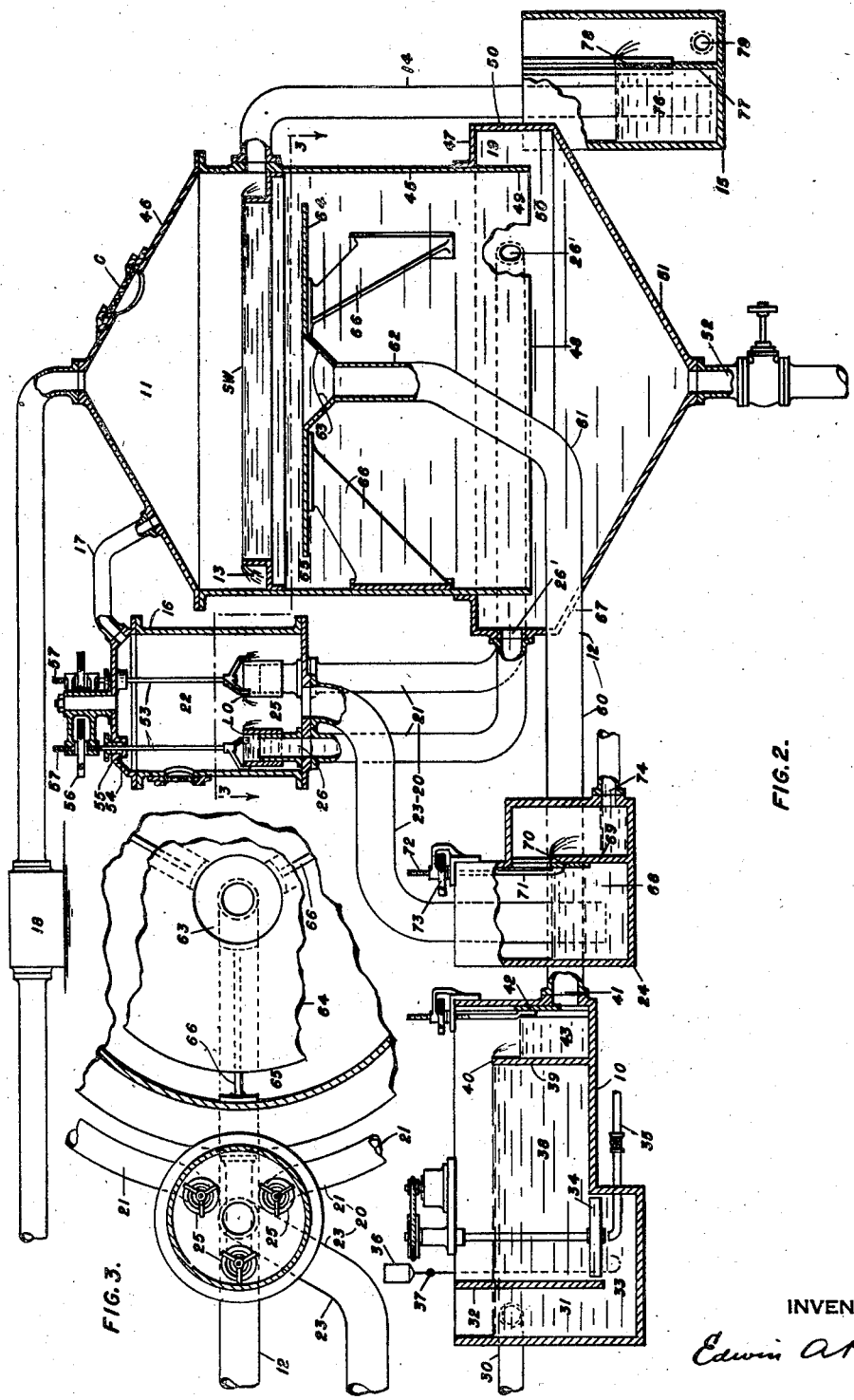
Fig. 2 is a vertical view, mostly in section, of one form of apparatus.
Fig. 3 is a partial horizontal sectional view taken as on the horizontal planes indicated by the broken line 3—3 of Fig. 2 looking in the direction of the arrows.

Tank of Figs. 1, 2 and 3

Respecting the tank unit of the form shown in Figs. 1, 2 and 3 it will be noted that this embodies an upwardly-extending marginal wall 45 circular in plan and a rising cap or top member 46 connected to the upper edge portion of the marginal wall; an annular ring-shaped member 47 connected to the lower portion of the marginal wall, extending outwardly therefrom and disposed at elevation somewhat higher than that of the lower edge 48 of the marginal wall whereby the member 47 constitutes the roof or top portion of the bustle section 19 and whereby the lowermost portion 49 of the marginal wall provides an inner wall for the bustle section 19; an outer cylindrical member 50 extending downwardly from and connected to the outer edge of the annular ring member 47 whereby the cylindrical member 50 constitutes the outer wall of the bustle section 19; and a dish-shaped or depressed bottom member 51 which is connected to the member 50 whereby the member 51 provides the lower defines for the bustle section 19 and also serves to provide a floor for the tank.

In the functioning of the apparatus some sedimented material may collect on the bottom of this tank and a valve-controlled discharge means 52 is provided for the release or discharge of such sedimented material from the interior of the tank if and when it becomes advisable to do so incident to the normal operation of the apparatus.

It is clear from the drawings and from that which has preceded how the liquid can pass from the bustle section 19 upwardly into the pipe sections or conduits 21. In the construction of the form shown by said Figs. 1, 2 and 3 and the overflow weir means providing the liquid-fraction overflow weir LO is realized by vertically adjustable overflow tips that surround the upper end portions of the conduits 21. These overflow tips or weir members 25 in effect become continuations of or positionable members associated with the pipes or conduits 21. The adjustment thereof is effected through the medium of the rods 53 which pass through the sealing means 54, providing packing material at 55 and which rods are actuated through the medium of suitably supported handwheels which function as adjusting nuts 56 on the screw threaded portions 57 of the rods 53. The upflow conduit sections 21 are three in number as is apparent from Fig. 3. The intake ends 26 thereof are symmetrically arranged with respect to the bustle section 19 of the tank 11 and the upper outflow ends thereof are symmetrically arranged about and with respect to the upper or intake end of the downflow conduit or barometric leg 23.

The upper overflow weir edges of the tips or members 25 collectively constitute or provide the liquid overflow weir LO which determines the minimum, and in effect the normal operative level for the liquid within the tank. The elevation of each of these high liquid-fraction overflow weir members or tips 25 is generally somewhat lower than that of the transfer-weir edge SW past which froth or scum must pass on its way to the receiving launder 13 therefor. By effecting the desired adjustment or elevation of these members 25 and thereby of the general elevation for the liquid overflow-weir edge LO one is enabled to effect a controlled split delivery of the clarified liquid-fraction as overflow material past the high liquid-overflow weir LO and of the scum or float-fraction past the scum or float-transfer weir edge SW.

The pump means 18 is relied upon to maintain the vacuum or reduces atmospheric pressure conditions within the tank so that the reduction in pressure when compared with that of the atmosphere is by way of example in the neighborhood of approximately 9" of mercury or thereabouts, or, as otherwise expressed, in the neighborhood of approximately 9 ft. of water. The reduced pressure maintained within the tank must be sufficient to cause a draft effect whereby liquid will overflow the weirs, or, as otherwise expressed, the reduced pressure maintained within the closed top separation tank 11 must be sufficient whereby the atmospheric pressure of the outside air on the overflowed liquid suspension in the receiving section 43 of the basin 10 is sufficient to effect or force the transfer, as feed delivered into the tank, of liquid suspension from the receiving section 43 into and through the draft tube 12 and the upward delivery from the upper expanding end 63 of the rising upflow section 62 of the draft tube into the ever changing body of liquid undergoing treatment within the closed top or main tank 11. The upper-most or terminal edge of the rising section 62 is at elevation lower than that of the overpass transfer edge of scum weir SW or of the overflow edge of liquid-overflow weir or effluent dam LO. The liquid thus passed inwardly through the draft tube is submergedly delivered within the liquid-holding portion of the tank but at elevation substantially higher than that of the lower edge 48 of the marginal wall 45, or as otherwise defined, at an elevation substantially above that of the intake openings for the upflow pipes 21.

It will be noted from that which has preceded that the body of liquid within the tank is maintained up to a level determined by the liquid-overflow weir LO and that above this general level there exists the air or other gas which is maintained, within the tank and its associated auxiliary chamber, at a sub-atmospheric pressure determined by the operating of the pump 18. This vacuum or reduction in pressure of the gas as compared with that of the outside air has on the body of liquid suspension overlain thereby and exposed thereto a functional effect which is greatest in the uppermost portions of the liquid, and the effect thereof progressively decreases with respect to the liquid in the lower levels. The vertical distance between the scum-transfer edge SW and the lower edge 48 of the marginal wall 45 is therefore preferably made so that it approaches the height of the column of water which indicates the pressure differential between the inside and outside of the tank. In other words, for the pressure reduction mentioned, the vertical distance between either the scum-transfer weir edge SW or of the liquid-overflow weir edge LO on the one hand and either the lower edge 48 or the entrance ends 26' of the conduits 21 on the other hand, would be in the neighborhood of 9 ft., possibly somewhat less, and the entrance or intake end 41 of the draft tube 12 should be at elevation somewhat lower than that of the lower edge 48. The edge 48 roughly indicates the upper limits of an assured region of relative quiescence. The portion of the tank extending downwardly below this line may be viewed as providing a zone of relative quiescence favorable to the settling of solids therein and it is from this general region that the clarified liquid is taken that is passed to discharge from the bustle section 19 to the exterior of the tank by means of the pipes 21, past the high-liquid overflow weirs LO and ultimately downwardly through the barometric leg 23.

Respecting the construction of the draft tube 12, this comprehends in succession a lower horizontally-extending section 60, the intake end 41 of which has a water-tight connection to the basin 10, a curved intermediate or elbow portion 61 and a rising upflow section 62 terminating in an expanding delivery throat 63. The delivery end of the draft tube has associated therewith an annular distributing plate 64 which is submergedly disposed within the liquid-holding portion of the tank 11. This plate is at elevation somewhat lower than that of the scum transfer edge SW and at elevation substantially higher than that of the lower edge 48 of the marginal wall 45. This plate 64 is connected to the throat portion 63 of the draft tube whereby in effect it becomes a horizontal extension or flange for said throat portion. This plate is of less diameter than that of the interior of the marginal wall whereby an annular downflow passageway is left at 65. Brackets 66 are secured to the marginal wall 45 for supporting the plate 64 and thereby the inner or terminal end of the draft tube 12. There is a liquid-tight connection at 67 between the outside portion of the draft tube and that portion of the tank structure whereat the draft tube passes from the exterior of the tank into the tank.

The inflow velocity of the liquid through the tube is sufficient to insure a delivery from the upper end of the tube of any and all solid matter which may exist in the suspension supplied therethrough to the interior of the tank 11 but this velocity should not be sufficient to cause a degree of turbulence within the upper portion of the tank that would prevent a proper splitting of the floating material as a float-fraction and the clarified liquid as a clarified liquid-fraction.

For effective operation the distributing plate 64 may be disposed at an elevation, for example, one and one-half feet to two feet lower than that of the scum-transfer edge SW, but the elevation selected may vary according to the type of liquid suspension treated, the type of scum-fraction or split off desired, or the degree of vacuum or reduced pressure employed for the gas overlying the ever-changing liquid only within the tank 11.

The inflowing suspension is preferably detained over the distributing plate a sufficient time whereby there is an effective rising of the floatable material to the top of the liquid body as a whole as the operative influence of the reduced pressure gas within the upper portion of the tank is most effective upon the uppermost portion of the liquid body. This horizontal plate 64 also leads to a more quiescent condition of the liquid immediately underlying the same by compelling a realization of a major effect of the reduced gas pressure on that portion of the supplied liquid suspension while the latter is in transit over and along the upper surface of said plate 64.

Reference has heretofore been made to the barometric leg or conduit section 23 by which overflowed clarified liquid is passed into the low clarified-liquid release tank or box 24. An inspection of Figs. 1 and 3 will show that this barometric leg 23 has been shaped so that the low tank or box 24 into which it extends is, in plan, located at one side of the draft tube 12 whereby the barometric leg can pass downwardly by the draft tube. The low tank 24 is in the form of an open box or tube and a body or pool of sealing liquid 68 is maintained therein up to a minimum elevation by a dam 69 having for the overflow member thereof a weir member 70 which is adjustable as to height through the medium of a rod 71 having a threaded upper end 72 and an associated handwheel or nut 73 which is suitably supported from and with respect to the tank or box 24. The lower discharge end of the barometric leg constantly dips into the body or pool of sealing liquid 68. The clarified liquid flowing into said pool or body of sealing liquid is ultimately released over said weir member 70 and ultimately flows from the box as through any suitable outflow means 74. Because of this functioning of the structure described, this box or tank and its associated parts is sometimes herein referred to as a liquid-fraction release box having a low liquid release weir 70. This box or tank is also sometimes referred to as an effluent receiver.

The description hereby given with respect to this clarified liquid-release box substantially applies to the similar construction in the form of each of the other figures.

As to the barometric scum-discharge leg 14 and the release box 15 into which it extends, it will be noted that a body or pool 76 of sealing liquid is maintained therein because of a dam structure 77 which can be positioned as to overflow elevation by removable or replaceable overflow boards 78. This body or pool of liquid 76 may be provided by liquid initially supplied thereto as a sealing medium for the discharge end of the barometric leg which dips into the same. Such sealing body or pool will be maintained because there will always exist more or less liquid which passes the scum weir or transfer edge SW with the floating material that passes into the scum-receiving launder 13. The overflowed or release scum which passes the weir edge provided by the upper board 78 is ultimately passed for the desired disposition by any suitable means as for example by a conduit or pipe 79. This overflow box or tank typifies the overflow box or scum release means as shown in the other forms herein illustrated and is sometimes referred to as a scum or float-fraction release box having a low scum-release weir 77. It is also sometimes referred to herein as a scum collector.

The description hereby given with respect to the scum collector or float-fraction release box having a low scum release weir substantially applies to the similar construction in the form of each of the other figures.

Figure 4:
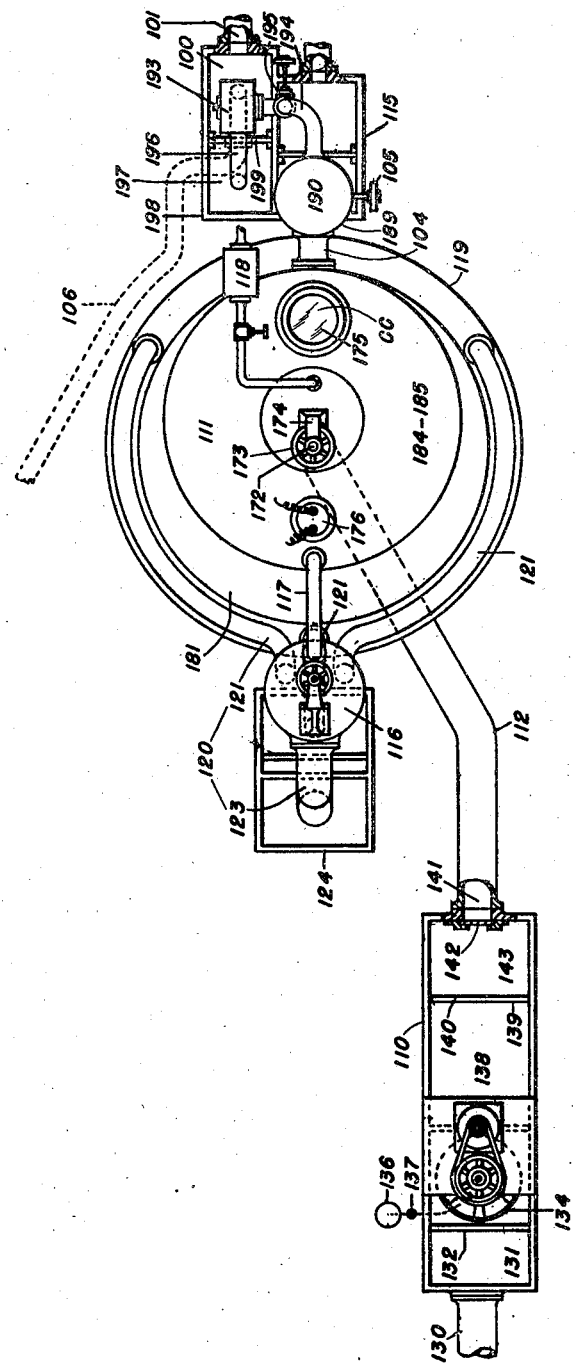
Fig. 4 is a plan view, partly in section.

*Apparatus of Figures 4, 5 and 6*

In the main the features of construction of this apparatus correspond to the apparatus of Figs. 1 to 3 inclusive already described.

In the tank 111 of this second form there is the upwardly extending marginal wall 145 which is circular in horizontal cross section. At the lower portion of this wall there is the structure providing the bustle section 119 and the dish-shaped or depressed member 151 providing the bottom of the tank. The closure top for the tank is provided by an upwardly and inwardly-extending roof member 181 and an inverted cup-shaped member 184. The roof member 181 in shape resembles the surface of a frustrum of a cone and terminates in an upwardly-extending cylindrical throat portion 182 that provides an upflow opening the center of which is concentric with the marginal wall 145. The lower edge of this roof member has a gas-tight connection to the upper edge of the marginal wall 145. In the construction shown there is associated with the fixed cylindrical throat portion 182 a vertically-adjustable weir, ring, or cylindrical member 183 of which the upper or overpass transfer edge portion provides the horizontally-extending scum overflow weir SW. The means by which this weir member 183 is supported and vertically adjusted will later be described.

In order to complete the capping or top closure for the tank there is employed the inverted cup-shaped member 184 embodying a top or uppermost portion 185 and a downwardly-extending flange or rim portion 186 which is circular in horizontal cross-section but which is assembled in position so that it is eccentric or off center with respect to the cylindrical throat portion 182. The eccentrically-disposed rim portion 186 of the gas-tight top or capping member 184 is connected to the roof member 181 whereby the gas-tight closure for the top of the tank is completed and whereby there is also provided the scum-receiving trough or launder 113 that progressively increases in depth and cross-sectional area as it approaches the passageway 187 leading into that portion of the scum-discharge structure which includes the barometric leg 114.

With respect to the scum-discharge structure illustrated in this figure, it will be noted that it embodies a hollow casing 188 that is connected to the tank 111 so as to be in communication with the scum weir 113 through the medium of a pipe 104 that provides the aforementioned passageway 187. The hollow casing 188 is made up of a hollow body member 189 and a cover member 190. It also has a transverse baffle 191 extending downwardly from the cover member 190. The lower end of the baffle terminates at elevation substantially lower than that of the opening or passageway 187 and higher than that of the floor portion or bottom 192 of the casing. In this manner a chambered structure is provided wherein any gas sucked therethrough is ridded or freed of liquid or solid particles which may have been entrained or in transit therewith.

A wet vacuum pump 193 is connected by suction piping 194 controlled by stop valve 195 to the hollow casing 188 in a manner whereby it is in direct communication with that upper portion of the chamber therein which is at the side of the baffle opposite the passageway or intake opening 187 leading to the chamber. A descending pipe 196 leads from the discharge side of the pump. The lower end of this descending pipe 196 dips into a pool of sealing liquid 197 that is preferably maintained in a low box 198 having an overflow weir 199 past which there is a release of overflow liquid from the box 198 into the compartment 100 and therefrom through the discharge opening 101. The barometric leg or scum conduit 114 is connected to the hollow casing and leads downwardly from the lower portion of the separating chamber or casing 188. The barometric leg 114 is provided with a stop valve 105 which can be opened or closed at will or even adjusted to a partially open position at the will of an operator. The valve 105 can be left open and the valve 195 closed and in that instance the scum discharge construction will function exactly the same as the scum discharge leg 14 of the form previously described.

It is feasible, however, in connection with the apparatus just referred to to omit the operation of pump 118 or even to operate it at a rate somewhat less than that required to maintain the vacuum or desired reduced pressure conditions for the gas in the tank 111 and in such instance in order to take care of the vacuum requirements the wet vacuum pump 193 is brought into operation. In such instance if the valve 195 is open the scum which embodies some liquid will be sucked into the hollow casing 188 with the gas. Therein the scum and gas directly contact the baffle 191 and this causes much of the liquid and entrained solids to drop into the lower portion of the casing while, the gas continues on its way to the pump 193. In this way the entrained liquid or solids, or a major portion thereof, will enter the barometric leg 114, pass the valve 105 thereof and finally descend therethrough and from the leg 114 into the low release box 115. The gas and such scum as may continue entrained therewith will pass into the pump 193 and will thereby be delivered into and ultimately from the descending pipe 196 either into the box 198, or for example, to and through a valve-controlled discharge pipe 106.

Mention has heretofore been made that the scum weir 1SW as provided by the member 183 is vertically adjustable. This is accomplished through the medium of a spider 168 which is carried at the lower end of a vertically-adjustable rod or stem 169. This rod passes through a sealing means 170 having packing 171 engaging the rod. The upper end of the rod 169 is provided with screw threads 172 that are engaged by a hand-wheel or adjusting nut 173 which is suitably supported from the cap member 184 through the medium of bracket member 174. An inspection glass is provided at the top of the tank by the window structure 175. Means for illuminating the interior of the tank may be provided by a member having an electric light 176.

As to the outflow mechanism for the clarified liquid, it will be noted that the rising members or upflow pipes 121 thereof extend to and terminate at the lower end of the auxiliary tank or compartment structure 116, namely, in the compartment or section 127 hereinafter referred to. This tank or compartment structure 116 has a partition 125 that includes a vertically-adjustable overflow member or dam 126, that provides the high liquid-fraction overflow weir 1LO. The partition thus provided divides the lower interior portion of the chamber of the auxiliary tank 116 into a section 127 for receiving the liquid upflowing into the chamber, and a section 128 for receiving the liquid after it has overflowed the weir member 126. From the compartment or receiving space 128 the overflowed liquid passes into and through the depending barometric leg section 123 and therefrom into the pool of liquid in the low release box or effluent receiver 124.

The means for adjusting the weir or effluent overflow dam 126 is similar to that described in connection with the adjustable gates heretofore referred to or the adjustable weir member 183 providing the scum transfer edge 1SW of this form.

*Apparatus of Figs. 7 to 12 inclusive*

The form of apparatus of Figs. 7, 8 and 9 embodies the fundamental features of construction specifically described with respect to the first form shown in Figs. 1, 2 and 3. It also embodies certain details of construction quite similar to those shown in connection with the second form shown in Figs. 4, 5 and 6. In addition, this third form has certain features or details of construction peculiar to itself. This third form of apparatus is of a type which is peculiarly adaptable to divide liquid suspension having settleable solids therein into three fractions, namely, such as may be considered (1) a froth or scum-fraction, sometimes referred to as a float-fraction; (2) a liquid-fraction from which suspended solids have been floated and from which heavier solids have been settled whereby there is left the liquid freed of such solids, namely, a fraction which is generally referred to as the clarified liquid-fraction; and (3) a fraction essentially containing heavy solids which readily deposit as sediment at the bottom of the separation tank and which are progressively removed therefrom as a settled-solids fraction.

In this form of apparatus the incoming suspension is conducted from the receiving and treating basin 210 into the draft tube or pipe 212 which has a horizontally-extending intake section 260, a curved intermediate section 261 leading to an enlarged elbow section 268 from which there rises the upflow section 262 that terminates as the expanding throat 263 by which the incoming feed is submergedly delivered within the liquid-holding portion of the tank, namely, at an elevation somewhat lower than that of the overflow weir 2SW but substantially higher than that of the lower edge 248 of the marginal wall 245.

The top of the tank 211 as shown by Fig. 8 has an upwardly and inwardly sloping roof member 270 that provides a cylindrical upflow throat portion 271 which is concentric with the marginal wall 245 and also with the upflow section 262 and terminal throat portion 263 of the feed supply pipe or draft tube 212. A vertically-adjustable ring-shaped member 272 is arranged about the throat portion 271. This member 272 provides the scum overflow weir 2SW and the adjustment thereof is attained through the medium of screw threaded rods 273 which are vertically positioned through the medium of suitably supported handwheels or nuts 274. As will be manifest from an inspection of Figs. 8 or 13, the escape of gas past these rods 273 is prevented because of the packing and sealing construction provided at 275. The top portion of the tank is provided by a capping member 276, a downwardly and outwardly sloping member 277 and a downwardly and inwardly sloping portion 278. As to the member 277 this, in horizontal section, is circular in plan and it is disposed so that it is concentric with the scum weir 2SW, or as otherwise expressed, with the ring member 272 providing said weir. As to the member 278 this in horizontal section is circular in plan, but it is located and disposed so that any such horizontal circular section thereof is eccentric with respect to the scum weir 272 whereby there results a scum launder or trough 213 which progressively increases in depth in passing towards the discharge section thereof which leads into the barometric leg 214. The members 276, 277 and 278 are connected so as to provide a gas-tight structure and the member 278 is in turn provided with a gas-tight connection between it and the roof member 209. The packings 275 about the rods 273 are disposed in pockets provided on the member 277 as is manifest from Figs. 8 and 13.

The means 220 for passing the clarified liquid from the lower or intermediate portion of the tank, to wit, from the bustle section 219 embodies the upflow conduits 221, the auxiliary tank or chamber-providing structure 216 and the downflow conduit or barometric leg 223. In the instance of this structure, it will be noted that the upper ends of the upflow or rising conduits 221 are in alignment (see Fig. 7) and terminating in the lower portion of auxiliary tank 216 so as to deliver the liquid into section 227 of the chamber 222 of that tank. The lower portion of the chamber 222 is divided by the partition 225 and adjustable weir member 226 of that partition into said section 227 and section 228, the latter of which is disposed for receiving overflowed clarified liquid passing thereto from chamber 227 over the adjustable member 226 or weir 2LO. The elevation of the weir 2LO, namely, of the high liquid-fraction overflow weir or effluent overflow dam as it is frequently referred to is generally preferably lower, it may be only slightly lower, than the elevation of the scum weir or overpass transfer edge 2SW.

In this form of apparatus provision is made whereby there may be ensured a general elevation for the surface level of the liquid which is within a range between pre-determined maximum and minimum elevations. In order to accomplish this, there is provided means for maintaining functionally separated from the scum, a relatively segregated small body of liquid which is in constant communication with the lower portion of the main quantity of the liquid in liquid-holding section of the tank. By way of illustration such segregated liquid is shown as a body 280 which its maintained in a space within a confining means 281. This body of liquid is in constant hydraulic communication with liquid in the lower liquid-holding portion of the tank, as for example, by being established in communication with the liquid in bustle section 219 through the medium of a pipe or other equivalent communicating member 282. The upper portion of the member 281 is in constant gas communication with the upper interior portion of the tank 211. This may be accomplished through the medium of the pipe or communicating member 283, particularly if the confining member 281 is located outside of the tank 211. There is arranged for use in conjunction with this segregated body of liquid 280 a wet vacuum type of pumping means having two intake portions preferably provided by adjustable intake nozzles, namely, a wet pumping means 279 having a lower intake means 284 provided with a lower adjustable intake nozzle 285 and an intake means 286 provided with an upper adjustable nozzle 287. The discharge from this pump is through the medium of a discharge leg 288 which is arranged to dip into a low liquid-holding box 291 containing sealing liquid 292 for sealing the discharge end of this pipe. The box 292 has an overflow dam or release weir 293 (see Fig. 7a) a section 294 for receiving overflowed liquid, and an outflow pipe 295. It is feasible, however, to eliminate the employment of the discharge leg 288 as a barometric leg but in that case the pump should be of a type which would be able to discharge liquid therefrom without permitting the back flow of air therethrough. Stop valves may be provided at 296 and 297 respectively for the lower and upper suction lines 284 and 286 of the pump.

As to the lower nozzle member 285, it is to be noted that this is adjusted in any suitable manner as by the handle 289 so that it can swing about a horizontally-extending axial bearing to raise or lower the free or tip end of the nozzle member. It will also be noted that this nozzle member and the pipe extending therefrom is constructed to provide a downward passage no part of which rises above the intake end of the nozzle. In other words, any liquid entering the tip end of the nozzle will necessarily gravitate towards the pump; such liquid does not have to raise over a weir or any elevated point on its way to the pump. On the other hand, it will be noted that the upper nozzle 287 which is adjustable through the medium of the handle 290 is positionable so that the intake end or movable tip portion thereof swings up andd own and any flow of liquid or gas into that nozzle is raised from the elevation whereat liquid is usually received thereinto whereby the liquid generally has some inward movement, due to an upflow passageway leading from the intake tip of the nozzle prior to entry into the downflow portion of the upper suction line 268

In the normal operation of the apparatus the free end of the nozzle 285 of the lower suction line 284 is raised to a position higher than that of the overflow weir 2LO; in some instances, it may be raised to elevation even higher than that of the scum weir 2SW. The particular elevation employed is primarily dependent upon the type of incoming material supplied for treatment and the character of material which has to pass the scum weir 2SW. This vacuum pump 279 determines the vacuum or degree of reduced pressure within the entire tank and associated system and in orer to prevent the existence of too great a vacuum or too much reduced pressure within the system the upper nozzle 287 has been provided so as to commence to suck liquid and liquid only just so long as the elevation of the liquid in body 280 exceeded or tended to exceed the elevation of the intake section of that nozzle 287. By the adjustment of these two nozzles one can substantially control the quantity flow of liquid into the tank 211, or as otherwise expressed, the height of the liquid in the tank whereby the quantity of outflow over the weirs will be under the control of that liquid which is thus adjusted as to height by the associated nozzles 285 and 287.

A mechanical raking mechanism has been provided for the tank 211. This is embodied by a suitably driven and suitably supported horizontally-turntable bearing member 200 which is carried on a stationary bearing member 201. The turnable bearing member 200 carries a vertical shaft 202 which extends downwardly through a sealing construction 244 on the member 276, downwardly through the upflow section 262 and the enlarged elbow portion 266 of the draft tube 212 to a locality within the lower region of the tank 211 whereat it supports a rake-carrying member 229 comprising outwardly-extending arms 246 from which depend sediment-engaging and conveying means 347 provided by a chain disposed for engaging sedimented material that is lodged upon the floor provided by the tank bottom 251.

Sedimented material is passed from the lower portion of the tank 211 through the valve-controlled conduit 252. In the instance of this construction this conduit has two valves or gates embodied therein, namely, an upper valve or gate 267 and a lower valve or gate 269. Normally the upper valve is closed and the lower one is open. Immediately below the lower valve 269 there is a closed chamber structure 203 having an open top body member 204 and a top member 205. In the chamber of this structure there is a sands-transfer valve or wheel 206 having sands-receiving pocket portions or openings 207 therein. This sands-transfer wheel is horizontally turned through the medium of a vertically-extending shaft 208 and speed reducing and power transmission mechanism 264 driven from the rotor 265 of motor 266. Sands passing to this wheel 206 are received in the successive pockets or openings and are transferred by the wheel to a locality whereat it is delivered or passed into a transfer conduit 298 from which it is discharged into a receiving chamber or tank 299 from which the sand is conveyed to a locality from the apparatus by means of a sprocket, chain and flight conveying mechanism indicated at 249. In order that there may be avoided any undue downward pressure on the sand wheel, it is feasible to make this tank or receptacle 299 relatively deep so as to hold water therein of sufficient depth to provide substantial counter-balancing pressure operative against the underside of this wheel 206. If for any reason it is desired to empty the tank 211 this can be readily accomplished even when the lower valve or gate 269 is closed merely by opening the upper valve 267. When the downward passage of sand through the conduit 252 is prevented by the closing of the lower gate or valve 269 one is enabled to obtain access to the sands transfer wheel 206 should occasion require.

There may be instances where it is advisable to inject gas or liquid into the elbow section of the draft tube, namely, in the form of jets which extend into the elbow section and which are upwardly directed towards and into the upflow section 262; such mode of injection is indicated in Fig. 12 by nozzle type of injector head 253. The liquid or air passed to this head 253 is supplied as through the medium of a pipe 254 which is on the delivery side of a pump 255 the latter of which has a valve-controlled air suction line 256 leading from the upper interior portion of the tank 211 and a valve-controlled water suction line 257 leading for example from the liquid-holding compartment 227 whereby clarified liquid from the tank may be returned for any purpose desired into and through the injector or distributor head 253.

It will also be noted in this connection that any pumping of air or other gas from the upper interior portion of the tank back into the tank or any pumping of liquid from any portion of the unit back into the tank does not change or alter the reduced pressure conditions of the gas within the tank or height of liquid within the tank. There are instances where it may be advisable to inject air into the froth or floating material in the upper portion of the tank in order to function as a means for impelling the floating material towards and past the scum overflow weir or float-transfer edge 2SW. Such a means is indicated in vertical section by Fig. 13 and in plan by Fig. 14.

*Respecting Figs. 13 and 14*

In these figures the distributing head for the air is indicated by 300; the jets of air 301 delivered therefrom have a tangential arrangement or disposition as is clear from Fig. 14 whereby they tend to impart a slight swirling and progressive outward movement on the float material towards the scum overflow weir 2SW, and thus aid in effecting the passing of the floating material past the weir without compelling the possible employment of an undue amount of overflow liquid to accomplish that purpose. The gas employed for this purpose is preferably some of the reduced pressure air or other gas which is sucked from the upper interior portion of the tank 211 into the pump 302 through the suction line 303 indicated in Fig. 13 and delivered through the line 304 into the distributing head 300. Figs. 13 and 14 are indicative of a type of construction which can be used in connection with the tank 211 and particularly in connection with the form of apparatus shown in Fig. 8. Figs. 13 and 14 should be therefore viewed as details of construction which are used in and as part of the form of construction shown in Fig. 11.

*Respecting Fig. 15*

In Fig. 15 there is illustrated a modified form of adjustable scum overflow weir which is herein designated as 342 as it may be substituted in place of the scum overflow weir 272 shown in Fig. 8. The type of overflow weir just referred to leads to a steady and easy transfer of froth material by avoiding a sharp edge or ledge over which the floating material must pass on its way into the scum launder 13.

*Further respecting Figs. 7 to 12 inclusive*

Reference is now made to the construction of the draft tube 212 and the associated baffle or distributing means at the terminal thereof as shown in Fig. 8. Here it will be noted that instead of employing a flat distributing disc as is the situation in the instance of two forms previously described, there is a downwardly and outwardly sloping member 250 and there is a passage area 258 between the upper surface and outer edge of this member 250 and the inner contour of the top member 270 of the tank. The upper surface of this member 250 follows the contour of a frustrum of a cone and ensures sufficient retention thereover of the liquid-solids suspension whereby it continues under the relatively direct or most powerful influence of the reduced pressure existing within the upper portion of the tank. Because of its shape the distributing member 250 provides for the gradual downward slipping of any settable solids which are not susceptible to the influence of the reduced pressure of the air within the tank. Immediately below this distributing member 250 there is a downwardly and inwardly extending member 259 which permits an easy, gradual and relatively unobstructed rising of any material tending to rise from the region immediately below it, particularly of any material tending to move upwardly because of the reduced pressure conditions maintained within the tank. This member 259 also serves as a means by which the inner or upper end section of the draft tube derives support from the marginal wall 245 through the medium of the members or brackets 359.

With respect to the liquid-height control as realized by the adjustable nozzles 285 and 287, it will be noted that these nozzles and the pumping structure associated therewith can be located anywhere with respect to the apparatus whereby it can engage and control a segregated portion of the body of liquid within the tank that is preferably separated or baffled from the scum within the tank whereby clear liquid relatively free of floating material will come under the influence of these nozzles. A prime purpose of these nozzles is to maintain and establish minimum and maximum level elevations within relatively fine and carefully selected limits. For this purpose these nozzles could therefore be placed directly within the main tank itself or within the liquid-holding portion of the auxiliary tank structure 216, or as otherwise expressed, they do not have to be embodied in and as part of an outside structure or chamber.

*General*

In each of the forms shown the incoming liquid suspension is treated as by the dispersion of air, and other material, and throughout the same, namely by the air distributing and dispersing means employing the impeller 34, 134 or 234. Such treated liquid suspension is preferably held just long enough within the treating station or basin 10, 110 or 210 to permit the escape of large gas bubbles but whereby the small dispersed gas bubbles will continue therein. The pre-treated liquid suspension is conducted through the draft tube and is thereby submergedly delivered upwardly into the body of liquid or liquid suspension maintained within the separating chamber. In this chamber under the influence of the reduced pressure gas therein there is effected a rising of the float material as froth, scum, or other floating material to the top of the liquid within the tank. The collecting floating material passes the overpass transfer edge of overflow weir SW, 1SW or 2SW thence into the scum launder 13, 113 or 213 from which it is delivered to a locality outside of the tank without permitting the ingress of air into the tank 11, 111 or 211, as the case may be, namely, through suitable discharge means such as is provided by the barometric leg construction 14, 114 or 214. Clarified liquid from a lower or intermediate portion of the tank, to wit, from a bustle section 19, 119 or 219 thereof, passes through the upflow conduits 21, 121 or 221, past the high liquid-fraction overflow weir or effluent overflow dam LO, 1LO or 2LO from which it is delivered as overflow effluent into a region from which it passes through a barometric leg construction or other equivalent means to the exterior of the unit without permitting the entrance of air into the tank. In the form shown in Fig. 8 there is provided means whereby a three-way of fraction split can be carried out to obtain a froth or float-fraction, a clarified liquid-fraction, and a sedimented solids-fraction.

Suitable window structures each having a transparent medium as glass is provided as at C, CC or CCC whereby the interior conditions within the upper portion of the unit can be observed, particularly as to the overflow conditions for the scum in the region of the scum weir, or for the outflowing liquid in the region of the liquid-fraction overflow weir.

These windows may be located and availed of for observing operating conditions in any part of the structures. The window structures are preferably large enough to serve as manholes or access openings. Such window structures are normally closed and the access openings provided thereby are indicated in the different forms, namely, by reference characters C, CC or CCC.

Novel features of construction revolve about the mode in which the different parts of the tank and its associated features are brought into cooperative organization and arrangement. Novel features of the construction described are set forth and are more particularly defined in and by the claims hereof.

This application is a continuation of and a full substitute for and in place of parent application Serial No. 430,972, filed February 14, 1942.

What is claimed is:

1. Apparatus comprising a closed tank adapted to hold an ever-changing body of liquid suspension being treated; an auxiliary chamber adapted to hold liquid with a space for a gas atmosphere overlying and contacting the liquid; effluent-outflow means including a dam having within said chamber an overflow edge lower than that of the uppermost interior portion of the tank and chamber whereby normally to determine the surface level of the body of liquid in the tank sufficiently low to provide therein space for a gas atmosphere overlying and contacting the liquid body; feeding means for delivering feed liquid submergedly to the liquid body and having a discharge terminal at an elevation lower than that of the overflow edge of said dam; means normally sealing said feeding means against leakage of outside air thereinto and thence into the tank; scum removal means for withdrawing scum floating on the body including an open top trough having an overpass edge at an elevation approximate that of the overflow elevation of said dam for receiving floating scum passing over said edge into the trough, scum transfer means for passing scum from the trough to a region outside of the tank and means for minimizing leakage of outside air into and through said scum transfer means; means for providing gas communicating passage area between the spaces for gas overlying the liquid in the tank and the liquid in the chamber; and means for sucking gas from at least one of said spaces for subjecting liquid underlying the gas within both spaces to sub-atmospheric pressure; said effluent-outflow means having its dam operatively disposed with respect to the chamber and including an intake section for receiving liquid passing thereinto from a region within the tank which is at elevation lower than that whereat feed liquid is submergedly delivered into the tank from the discharge terminal of the feeding means, a conduit leading from the intake section to the chamber whereby to realize a column of upflowing effluent which must pass as overflow from said dam, an effluent receiver for retaining a quantity of effluent as a sealing medium, and an overflowed-effluent conduit extending downwardly from a portion of the chamber at the delivery side of the dam and dipping in the sealing medium for providing a barometric leg.

2. Apparatus according to claim 1, in which the dam is located within the auxiliary chamber, and in which the overpass edge of the scum trough extends horizontally and is disposed at an elevation somewhat higher than that of the overflow edge of the dam.

3. Apparatus according to claim 1, with the addition of means for effecting relative vertical adjustment as between the overpass edge of the scum trough on the one hand and the overflow edge of the dam on the other hand.

4. Apparatus according to claim 1, having means positionable from outside of the apparatus for effecting relative vertical adjustment as between the overpass edge of the trough on the one hand and the overflow edge of the dam on the other hand.

5. Apparatus according to claim 1, wherein the dam has means extending from it to a place of atmospheric pressure whereby to adjust the elevation of the overflow edge of the dam and thereby the overflow elevation of liquid in transit through the auxiliary chamber thereby controlling the level of the liquid within the tank.

6. Apparatus according to claim 1, wherein the tank has at the lower portion thereof an effluent collecting section annular in plan providing the intake section of the effluent outflow means and wherein the effluent outflow means comprises a plurality of upflow pipes each constituting a conduit leading to the chamber from the thus provided inlet section and as to which pipes the lower intake ends thereof are symmetrically spaced and are in communication with said collecting section while the upper ends extend into the auxiliary chamber whereby to provide individual effluent overflow members that collectively function as the overflow dam.

7. Apparatus for performing a continuous process for separating and removing suspended matter as scum from a liquid suspension, which comprises a closed tank providing a liquid-holding portion for the detention therein of an ever-changing body of such suspension having a liquid level normally maintained up to a minimum elevation and providing an upper interior portion affording a gas-confining space wherein there exists a gaseous medium at sub-atmospheric pressure that contacts said body; a closed auxillary chamber providing a liquid-receiving portion and an overlying interior portion affording a gas-confining space; means defining a communicating gas passageway between said gas-confining spaces whereby the sub-atmospheric pressure conditions therein continue substantially alike; outflow-conduit means having a low intake for receiving liquid from the ever-changing body within the tank and leading upwardly to the auxiliary chamber for holding a column of upflowing effluent; effluent overflow dam disposed within the auxiliary chamber and having an overflow elevation lower than that of the top interior of the closed tank for determining said minimum elevation for the liquid level in the tank; gas-exhausting means operatively connected to the upper interior portion of the apparatus for removing gas from said gas-confining spaces whereby sub-atmospheric pressure is maintained therein; suspension feed means having a discharge terminal at elevation higher than that of the intake of the outflow conduit means but lower than that of the overflow edge of the dam for submergedly delivering such suspension as feed material into said tank; means for normally sealing against leakage of outside air into and through said feed means and thence into the tank; an effluent receiver for retaining a quantity of the effluent as a liquid sealing medium; conduit means providing a barometric leg for conducting overflowed effluent from the auxiliary chamber downwardly into the receiver and dipping into the sealing liquid therein; a scum trough located in the upper interior portion of the tank and having an overpass edge at elevation approximate that of the overflow edge of said dam; means for discharging scum from said trough to the exterior of the apparatus and means for minimizing leakage of outside air into and through said last mentioned means and thence into the tank.

8. A unit of the class described comprising in operative combination and arrangement a gas-tight tank; a gas-tight auxiliary chamber, means providing gas communication between the upper portion of the tank and the upper portion of the chamber; upflow conduit means leading from a lower portion of the tank into the lower portion of the chamber; an effluent receiver exposed to the atmosphere for receiving liquid discharged thereinto and having a release weir for retaining liquid in the receiver up to the elevation of the weir; a conduit providing a barometric leg extending from the lower portion of the chamber downwardly into said effluent receiver and terminating at elevation lower than that of said release weir; an effluent overflow dam operatively disposed with respect to the chamber and having an overflow edge over which liquid in transit to and through said chamber must pass before entering said downflow conduit, the elevation of which overflow edge is lower than that of the uppermost interior portion of the tank; a feed-supply basin for holding the material to be treated in a manner whereby said material is exposed to the atmosphere; feeding means including a draft tube for transferring feed material from said basin into the tank at an elevation lower than that of the overflow edge of said dam but higher than that of the intake section of said upflow conduit means; a scum collector exposed to the atmosphere for collecting scum discharged thereinto, a scum outflow weir for the collector for retaining in the scum collector scum and liquid thereof up to the elevation of the scum weir; a scum-receiving hopper within said tank having an overpass edge at an elevation higher than that of the overflow edge of said dam but of sufficiently low elevation for permitting passage thereover of quantities of scum floating on the liquid body within the tank; a closed conduit providing a barometric leg extending from a portion of said hopper downwardly into the scum collector and terminating at an elevation lower than that of the scum outflow weir; and pumping means connected for withdrawing quantities of gas from the gas-communicating upper portions of the tank and chamber whereby the pressure of gas remaining therein is sub-atmospheric.

9. A unit of the class described for functioning in association with a feed supply basin for holding a supply of liquid suspension, with an effluent receiver having a release weir determining the minimum depth of the effluent retained in the receiver, and with a scum collector having a scum outflow weir determining the minimum depth of released liquid passing with scum into said collector; and which unit comprises a closed top main tank for holding within the lower portion thereof an ever-changing liquid body of supplied suspension fed thereinto and within the upper portion thereof a gaseous medium at sub-atmospheric pressure to which said body is directly exposed; barometric leg means for discharging effluent therethrough including an auxiliary compartment, an overflow dam functionally dividing the interior of the auxiliary compartment into pool retaining portion and overflowed liquid-receiving portion, a conduit section for upflowing effluent leading from a liquid-holding portion of the main tank upwardly to said pool portion, and a conduit section for gravitating effluent leading downwardly from said overflowed liquid-receiving portion into the effluent receiver for providing a barometric leg terminating therein at elevation lower than that of the release weir thereof, the overflow elevation of said dam being lower than that of the uppermost interior portion of the closed top of the main tank but higher than that of the intake portion of said upflowing effluent conduit section thereby determining a minimum normal liquid-level of the liquid within the tank, and the auxiliary compartment having within the upper portion thereof a gas-holding space extending to elevation substantially above that of the overflow elevation of said dam; means providing a passageway between the gas-holding spaces of the tank and of the compartment whereby the same sub-atmospheric pressure is realized in said spaces; pumping means connected and disposed for withdrawing quantities of gaseous medium from said passageway connected gas-holding spaces within the tank and chamber for maintaining the pressure therein sub-atmospheric; feed-conducting means comprising transfer piping having a continuously submerged intake leading from the liquid-holding section of said feed supply basin and terminating within the main tank at elevation lower than that of the overflow elevation of said dam but at elevation higher than that of the intake portion of said upflowing effluent conduit section; and a scum trough within the tank having an overpass edge at elevation approximate to but somewhat higher than that of the overflow edge of said dam and having a downflow tubular section providing a barometric leg leading from said trough into the scum collector and terminating therein at elevation lower than that of the scum outflow weir thereof.

10. Apparatus comprising a closed tank to hold an ever-changing body of liquid the surface of which is directly exposed to overlying gases, means for sucking gas from the upper portion of the tank for effecting sub-atmospheric pressure on said gases, means for submergedly delivering gas-bearing liquid suspension into said body of liquid, a scum trough open to the gases in the tank, an overpass transfer edge for said trough at elevation lower than that of the top of the tank but higher than that at which the suspension is delivered and over which transfer edge scum floating at the top of said body must pass before being received into said trough, means for discharging scum from said trough to a locality outside of the apparatus, means cooperatively associated with the latter for minimizing leakage of outside air thereinto, effluent outflow means comprising a bustle section constituted as hereinafter described for conducting liquid from the interior of the tank to a region outside of the apparatus and means cooperatively associated with the effluent outflow means for minimizing the leakage of outside air thereinto; said tank having an upwardly extending marginal wall, roof means connected to said wall, an annular member providing the top of the bustle section the interior edge of which is connected to said wall at elevation higher than that of the lower edge of the wall whereby the lower end portion of the wall provides an inner wall member of the bustle section, an outlying ring connected to the outer portion of said annular member and extending downwardly therefrom providing a peripheral member of said bustle section, and a bottom member connected to the lower edge of said ring for completing the lower limits of the bustle section while providing for the tank a floor which is vertically spaced below the lower edge of the marginal wall whereby a constantly open effluent passageway is provided leading into the bustle section, the latter of which provides the effluent intake portion of the aforementioned effluent outflow means.

11. Apparatus of the class described comprising in combination a substantially closed tank embodying a marginal wall, a roof portion connected to said marginal wall and providing a gas-receiving space within the upper interior portion of the tank, an annular member providing the top of a bustle section whose inner edge is connected to said marginal wall at an elevation somewhat higher than that of the lower edge of the marginal wall, a peripheral member connected to the outer portion of said annular member and extending downwardly therefrom, a tank bottom connected to the lower portion of said peripheral member but vertically spaced below the lower end of said marginal wall to provide a substantially open passageway between them, and a scum trough within the tank having an upper margin thereof providing an overpass edge at an elevation substantially lower than that of the upper interior of the roof portion but at elevation substantially higher than that of the lower end of the marginal wall and over which transfer edge scum within the tank must pass before entering said trough; said bustle section being provided by said lower portion of the marginal wall, said annular member, said peripheral member extending downwardly from said annular member and a portion of said tank bottom; an auxiliary chamber associated with the tank having a liquid-holding section and an overlying gas-receiving space; means providing constant communication between the overlying gas-receiving space of the auxiliary chamber and the gas-receiving space within the upper portion of the tank; conduit means leading upwardly from the bustle section and delivering liquid into said chamber; means providing an effluent overflow dam within said chamber having an overflow edge at an elevation substantially higher than that of the lower end of the marginal wall and slightly lower than that of the overpass edge; means for conducting overflowed liquid from said chamber to a locality outside of the tank and associated therewith means for minimizing inflow therethrough of outside air; means for conducting scum from within said trough to a locality outside of the tank and associated therewith means for minimizing inflow therethrough of outside air; pump means for withdrawing gas from within the gas-holding spaces of said tank and chamber; and means for feeding liquid-suspension to the interior of the tank while minimizing inflow of outside air for delivering such fed material into a region of the tank which is at elevation somewhat lower than that of the elevation of the overflow edge of said dam but substantially higher than that of the lower end of the margin wall of the tank.

12. Apparatus comprising a closed tank to hold an everchanging body of liquid the surface of which is directly exposed to overlying gases, means for sucking gas from the upper portion of the tank for effecting and maintaining a sufficiently low subatmospheric pressure on said gases whereby the surface level of the everchanging body will be at elevation sufficiently high for floating scum to be passed from the body over the hereinafter referred to transfer edge into the trough also hereinafter referred to; means for submergedly delivering gas-bearing liquid suspension into said body and means associated therewith for minimizing the leakage of air thereinto; means for conducting effluent from a lower portion of the tank to a locality outside of the apparatus and means associated therewith for minimizing leakage of air thereinto; and scum discharge means for receiving floating scum from the body of liquid within the tank and for delivering the scum to a locality outside of the apparatus and means associated therewith for minimizing leakage of air thereinto; said tank having an upwardly extending marginal wall, bottom means connected to the lower portion of said wall, a frustro-conical roof member of which the small upper end is open while the outer portion of the larger lower end is connected to the upper portion of the marginal wall, means along the upper end of said roof member for providing a transfer edge circular in plan over which passes floating scum from within the upper end of said roof member, and an inverted cup-shaped capping member for completing a closure top for the tank, said capping member being disposed so that the top thereof is vertically spaced above said transfer edge and has a downwardly extending wall portion thereof circular in plan and eccentrically disposed with respect to said transfer edge as well as horizontally spaced about said transfer edge and extending downwardly to the frustro-conical roof member to provide with the latter a trough of progressively increasing depth for receiving scum passing said transfer edge, which said scum discharge means comprises the thus defined trough and also includes conduit means extending outwardly from the deep section of the trough.

13. Apparatus comprising a closed tank adapted to hold an ever-changing body of liquid suspension being treated; means for delivering feed liquid into said body; effluent-outflow means including a dam for controlling the liquid level in the tank to provide space for a gaseous medium overlying the liquid body into which the latter is directly exposed; an auxiliary chamber adapted to hold liquid with a space for gaseous medium overlying and directly contacting liquid therein; means providing communication between said spaces; means for sucking gaseous medium from at least one of said spaces for subjecting gaseous medium in said spaces to sub-atmospheric pressure; said effluent-outflow means including a conduit leading from a region in the liquid-holding portion of the tank at elevation lower than that whereat the feed liquid is delivered into ever-changing body and extending upwardly to the auxiliary chamber thereby providing means for holding a column of upflowing effluent enroute to the auxiliary chamber, effluent receiver for retaining a quantity of effluent as a sealing medium and an overflowed effluent conduit extending downwardly from the chamber and dipping into the sealing medium serving as a barometric leg; said tank having an upwardly extending marginal wall, a bottom member connected to the lower portion of said wall, a frustro-conical roof member of which the smaller upper end is open providing a throat portion while the outer portion of the larger lower end is connected to the upper portion of the marginal wall, means along the upper end of said roof member embodying a vertically operable throat adjusting member providing a transfer edge over which there passes floating scum from within the throat portion, an inverted cup-shaped capping member for completing the closure top of the tank so disposed that the top thereof is vertically spaced above said transfer edge and having wall portion surrounding but horizontally spaced from said transfer edge while extending downwardly to the frustro-conical roof member to provide with the latter a trough for receiving scum passing said transfer edge; a scum collector for holding sealing liquid therein; and conduit means leading from the trough and serving as a barometric leg extending into the liquid within said collector.

14. Apparatus according to claim 13, having means connected to said throat-adjusting member and extending into the atmosphere outside of said apparatus for vertically positioning said throat member.

15. An apparatus for performing a continuous process for separating and removing floatable matter as scum from a liquid suspension, which comprises in operative combination a closed tank providing therein a lower liquid-holding portion wherein there is established a body of such suspension and also providing therein an upper gas-holding space in which the gas directly overlies said body; a closed auxiliary chamber; a closed secondary chamber; said auxiliary chamber providing a lower-liquid-receiving portion for liquid passed thereinto from a column of upflowing effluent and an upper gas-holding space wherein gas directly overlies liquid within the lower portion thereof; said secondary chamber providing a lower liquid-holding portion and an overlying gas-holding space; gas-communicating means between the gas-holding spaces of said tank and chambers whereby the pressure of the gas therein is equalized; feeding means for delivering as feed material the liquid suspension to be treated in said main tank; means associated with said feeding means for minimizing leakage of outside air into the feed means and thence into the tank; upflow-conduit means leading from a low region of the liquid-holding portion of the tank to the liquid-holding portion of said auxiliary chamber, which said lower region is at elevation lower than that at which the feed material is delivered into the main tank; effluent-overflow dam means within said auxiliary chamber over which effluent passing in transit through the auxiliary chamber must overflow whereby the normal minimum level of the liquid body within said tank is maintained substantially up to an overflow elevation of said effluent-overflow dam means; tubular means for passing overflowed liquid from the auxiliary chamber to the exterior thereof; means associated with said tubular means for minimizing leakage of outside air into the tubular means and thence into the auxiliary chamber; means providing a passageway between the liquid-holding portion of the tank and the liquid-holding portion of the secondary chamber whereby the tank and the secondary chamber are in constant hydraulic communication; pumping means for sucking gas from said gas-holding spaces for thereby maintaining the gas therein at pressure substantially sub-atmospheric; said pumping means comprising intake suction piping having suction nozzle means providing an intake tip operatively disposed within the secondary chamber and positioned for receiving liquid preparatory to passing liquid through the nozzle means when the level of the liquid within the secondary chamber rises to exceed the elevation of said suction nozzle means whereby said pumping means functions to remove by suction liquid entering said nozzle means; a scum trough within the tank having an over-pass edge at elevation approximately that of the overflow elevation on said dam and over which edge scum floating within the tank must pass into the trough preparatory to delivery therefrom to a region outside of the tank; scum-discharge means for passing such transferred scum from the trough to the exterior of the tank; and means associated with the scum-discharge means for minimizing leakage of outside air into the tank.

16. Apparatus comprising a closed tank wherein there is normally maintained an ever-changing body of liquid directly exposed to an overlying gaseous medium; pumping means for sucking gaseous medium from the apparatus for maintaining gaseous medium remaining in the apparatus at sub-atmospheric pressure; feed supply means having a discharge section delivering gas-bearing liquid suspension containing floatable matter into the tank at an elevation intermediate the top and bottom of the tank and means for minimizing air leakage into said feed supply means; a trough open to the gaseous medium within the tank, an over-pass edge for the trough at elevation higher than said feed discharge elevation but lower than the the top of the tank over which over-pass edge floating material from the said body passes before being received in said trough; discharge means for passing floating material from said trough to outside the apparatus and means for minimizing air leakage into said discharge means; and effluent-outflow means leading from the interior portion of the tank at elevation lower than said feed discharge elevation to outside the apparatus and means for minimizing air leakage into said effluent-outflow means; said apparatus being characterized in that there is a pumping means having a gas suction line connected to and in communication with the interior of the upper gaseous medium holding portion of the apparatus, and a discharge line embodying a gas-distributing member having discharge orifices for delivering pumped gaseous medium as jets directed to impel the floating material over said over-pass edge.

17. Apparatus comprising a closed tank wherein there is normally maintained an ever-changing body of liquid directly exposed to overlying gas confined within the upper interior portion of the apparatus; pumping means for sucking gas from within the upper portion of the apparatus for maintaing gas remaining therein at sub-atmospheric pressure; feed-supply means having a discharge section delivering gas-bearing liquid suspension containing floatable matter into the tank at an elevation intermediate the top and bottom of the tank and means for minimizing air leakage into said feed supply means; a trough open to the subatmospheric gas within the apparatus, an over-pass for the trough edge at elevation higher than said feed discharge elevation but lower than the top of the tank and over which edge floating material on said body must pass before being received in said trough; discharge means for transferring floating material from said trough to outside the apparatus and means for minimizing air leakage into said discharge means; an effluent-outflow means leading from an elevation within the tank lower than that of said edge to outside the apparatus and means for minimizing air leakage into said effluent-outflow means; said apparatus being characterized in that it includes pumping means having a gas suction line for conducting sucked gas from the upper interior portion of the apparatus, and a discharge line having a terminal portion providing discharge openings located at elevation lower than that of the over-pass edge of the trough and delivering the pumped gas upwardly and outwardly into floating material within the tank for impelling the floating material over the over-pass edge.

18. Apparatus comprising a closed tank wherein there is normally maintained an ever-changing body of liquid directly exposed to an overlying gas; pumping means for sucking gas from the apparatus for maintaining gas remaining in the tank at sub-atmospheric pressure; a trough open to the gas within the tank, an over-pass edge for the trough at elevation intermediate that of the top and bottom of the tank and over which edge floating material on said body must pass before receipt in said trough; discharge means for passing floating material from said trough to outside the apparatus and means for minimizing air leakage into said discharge means; feed-supply means having a discharge section for delivering gas-bearing liquid suspension into the tank at an elevation lower than that of said edge and having means for minimizing air leakage thereinto; and effluent-outflow means leading from an interior portion of the tank but lower than that of said edge to outside the apparatus and having means for minimizing air leakage thereinto; said apparatus being characterized in that it has pumping means having a suction line leading from an upper interior region of the apparatus for sucking sub-atmospheric pressure gas therefrom, and a discharge line for delivering gas thus pumped into the liquid within the tank at elevation lower than that of the over-pass edge of the trough.

19. Apparatus comprising a closed tank wherein there is normally maintained an ever-changing body of liquid directly exposed to overlying gas; pumping means for sucking gas from the apparatus for maintaining gas remaining in the tank at sub-atmospheric pressure; a trough open to the gas within the tank, an over-pass edge for the trough at elevation intermediate that of the top and bottom of the tank and over which edge floating material on said body must pass before receipt in said trough; discharge means for passing floating material from said trough to outside the apparatus and means for minimizing air leakage into said discharge means; feed-supply means having a discharge terminal for delivering gas-bearing liquid suspension into the tank at an elevation lower than that of said edge and having means for minimizing air leakage into said feed-supply means; and effluent-outflow means leading from an interior portion of the tank lower than that of said edge to outside the apparatus and having means for minimizing air leakage into said effluent-outflow means; said apparatus being characterized in that there is pumping means having a suction line leading thereto from an upper interior region of the apparatus for sucking sub-atmospheric pressure gas, and a discharge line for delivering said gas thus pumped into the tank at elevation lower than that of said discharge terminal.

20. Apparatus comprising a closed tank wherein there is normally maintained an ever-changing body of liquid directly exposed to an overlying gas; pumping means for sucking gas from the apparatus for maintaining gas remaining in the tank at sub-atmospheric pressure; feed-supply means having a discharge terminal for delivering gas-bearing liquid suspension into the tank at elevation between the top and bottom of the tank and means for minimizing air leakage into said feed supply means; a trough open to the gas within the tank, an over-pass edge for the trough at elevation below that of the top of the tank but higher than that of said discharge terminal and over which edge floating material on said body must pass before receipt in said trough; discharge means for passing floating material from said trough to outside the apparatus and means for minimizing air leakage into said discharge means; and effluent-outflow means leading from an interior portion of the tank lower than that of said edge to outside the apparatus and means for minimizing air leakage into said effluent-outflow means; said apparatus being characterized in that there is pumping means having a suction line leading from an interior portion of the apparatus below said feed discharge terminal for conveying sucked fluid therethrough, and a discharge line for delivering the thus sucked and pumped fluid within the tank at elevation lower than that of said discharge terminal.

21. Apparatus comprising a closed tank wherein there is normally maintained an ever-changing body of liquid directly exposed to an overlying gaseous medium; pumping means for sucking gaseous medium from the apparatus for maintaining gaseous medium remaining in the tank at sub-atmospheric pressure; feed-supply means having a discharge section submergedly delivering gas-bearing liquid suspension containing floatable matter into the tank at feed discharge elevation intermediate the top and bottom of the tank and means for minimizing air leakage into said feed-supply means; a trough open to the gaseous medium within the tank, an over-pass edge for the trough at elevation higher than said feed discharge elevation but lower than the top of the tank over which edge floating material on said body must pass before receipt in said trough; discharge means for passing floating material from said trough to outside the apparatus and means for minimizing air leakage into said discharge means; effluent-outflow means leading from the interior portion of the tank at elevation lower than said feed discharge elevation to outside the apparatus and means for minimizing air leakage into said effluent-outflow means; said apparatus being characterized in that it includes a pump having a suction line in and constituting part of liquid transfer means leading from a liquid-holding portion of the tank functionally disposed below the delivery of said feed-supply means, and a discharge line leading from the pump for directively delivering pumped liquid into said feed-supply means for furthering the forward passage of feed material upwardly from the same.

22. Apparatus of the class described comprising a closed tank wherein there is normally maintained an ever-changing body of liquid directly exposed to overlying gaseous medium; pumping means for sucking gaseous medium from the upper interior portion of the tank for maintaining gaseous medium remaining in the tank at pressures sub-atmospheric; feed-supply means having a tubular section affording an upflow delivery portion disposed for submergedly delivering gas-bearing liquid suspensions containing floatable matter into the tank at a feed discharge elevation intermediate the top and bottom of the tank and means for minimizing air leakage into said feed-supply means; a trough open to the gaseous medium within the tank, an over-pass edge for the trough at elevation higher than said feed-discharge elevation but lower than that of the top of the tank and over which transfer edge floating material on said body of liquid must pass before being received in said trough; transfer means for passing floating material from said trough to outside the apparatus and means for minimizing air leakage into said transfer means; and effluent-discharge means leading from the interior portion of the tank at elevation lower than said feed discharge elevation to outside the apparatus and means for minimizing air leakage into said effluent-discharge means; said apparatus being characterized in that it includes pumping means for withdrawing sub-atmospheric pressure gaseous medium from within a gas-holding space of said tank, a discharge conduit leading from said pumping means, and a distributing head in which said discharge conduit terminates, which head is arranged in association with a portion of said tubular feed section and has discharge openings for delivering pumped gaseous medium into the tubular section for assisting the flow of feed material forwardly within the tubular section.

23. Apparatus for performing a continuous process for separating and removing suspended matter from a liquid-solids suspension, which apparatus comprises a closed tank providing within the upper interior portion thereof a section for holding a gaseous medium at sub-atmospheric pressure and providing within the underlying interior portion thereof a section for holding an ever-changing body of such liquid undergoing treatment that is constantly exposed to said overlying gaseous medium; a receiving trough, an over-pass edge for the trough over which floating material from the body of liquid undergoing treatment must pass preparatory to being received into the trough and whose elevation is substantially higher than that of the bottom of said tank but substantially lower than that of the uppermost interior portion of the top of the tank; a basin outside of said tank for holding under atmospheric pressure conditions feed liquid containing solids suspended therein; a draft tube having an intake end submerged within the liquid within said basin and a terminal discharge within but located above the bottom of the tank at elevation lower than that of said over-pass edge; an effluent receiver provided outside of the tank for holding therein a maintained body of effluent serving as sealing liquid; effluent-outflow means comprising a closed compartment, an effluent-overflow dam functionally dividing the compartment into an upflow-effluent receiving portion and an overflowed-effluent receiving portion, conduit means leading upwardly from a lower interior portion of the tank to said compartment, and conduit means providing a barometric leg leading downwardly from the overflowed-effluent receiving portion of the compartment into the effluent receiver so that the discharge end thereof is constantly submerged in the effluent within said receiver, said effluent dam having an overflow elevation lower than that of the uppermost interior portion of the compartment but proximate that of the over-pass edge for the trough; a collector located outside of the tank for holding therein a maintained body of sealing liquid; conduit means providing a barometric leg extending downwardly from said trough and into said collector so that the discharge end thereof is constantly submerged in the liquid within said collector; means providing constant gas communication between the upper interior portion of the tank and the upper interior portion of the compartment; gas pumping means for removing gaseous medium from the upper interior portions of the tank and compartment and for discharging gaseous medium pumped thereby to a locality outside of the tank, and a second pumping means providing a suction passageway leading to the second pump from the effluent-outflow means, and means providing a discharge passageway leading from the second pump disposed for delivering pumped fluid into a liquid-holding portion of the tank.

24. An apparatus for performing a continuous process for separating and removing suspended matter from a liquid suspension, which apparatus comprises a closed tank providing within the upper interior portion thereof a section for holding a gaseous medium at subatmospheric pressure and providing within a lower interior portion thereof a section for holding an ever-changing body of such liquid undergoing treatment that is constantly exposed to said overlying gaseous medium; a trough, an over-pass edge for the trough over which floating material from the body of liquid undergoing treatment must pass preparatory to being received in the trough whose elevation is substantially higher than that of the bottom of the tank but substantially lower than that of the uppermost interior portion of the top of the tank; a basin outside of said tank for holding under atmospheric pressure feed liquid containing solids suspended therein; a draft tube having a lower intake end submerged within the liquid in said basin and an upper discharge end within but located above the bottom of the tank at elevation lower than that of said overpass edge; an effluent receiver outside of the tank for holding therein a maintained body of effluent; effluent-outflow means comprising a closed compartment, effluent overflow dam functionally dividing the compartment into an upflow-effluent receiving portion and an overflowed-effluent receiving portion, the overflow elevation of said dam being lower than that of the uppermost interior portion of the compartment but proximate that of said over-pass edge, conduit means leading upwardly from a lower interior portion of the tank to said upflow-effluent receiving portion, and tubular means providing a barometric leg leading downwardly from the overflowed-liquid receiving portion of the compartment to the effluent receiver so that the discharge end thereof is constantly submerged in the liquid within said receiver; a collector located outside of the tank for holding therein a maintained body of sealing liquid; a tubular member providing a barometric leg leading downwardly from said trough and extending into said collector so that the discharge end thereof is constantly submerged in the liquid within the collector; means providing constant gas communication between the upper interior portions of the tank and compartment; gas pumping means for removing gaseous medium from the upper interior portions of the tank and compartment for discharging gaseous medium pumped thereby to a locality outside of the apparatus; a second pumping means; means providing a suction passageway leading to the second pump from a liquid holding region of the apparatus at elevation lower than that of said over-pass edge; and means providing a discharge passageway leading from the second pump for delivering pumped liquid into a lower portion of the draft tube.

25. Apparatus for performing a continuous process for separating and removing suspended matter from a liquid-solids suspension, which apparatus comprises a closed tank providing within the upper interior portion thereof a section for holding a gaseous medium at sub-atmospheric pressure and providing within the lower interior portion thereof a section for holding an ever-changing body of such liquid undergoing treatment constantly exposed to said overlying gaseous medium; a trough, an over-pass edge for the trough over which floating material from the body of liquid undergoing treatment must pass preparatory to being received into the trough whose elevation is substantially higher than that of the bottom of said tank but substantially lower than that of the uppermost interior portion of the top of the tank; a basin outside of said tank for holding under atmospheric pressure feed liquid containing solids suspended therein; a draft tube having an intake end submerged within the liquid within the basin and a terminal end discharging into the tank at elevation lower than that of said over-pass edge; an effluent receiver outside of the tank for holding therein a maintained body of liquid; conduit means leading from a lower portion of the tank having a barometric leg extending into said receiver so that the discharge end thereof is constantly submerged in the liquid within said receiver; a collector located outside of the tank for holding therein a maintained body of liquid; conduit means providing a barometric leg section leading from said trough extending into said collector so that the discharge end thereof is constantly submerged in the liquid within the collector; gas pumping means for removing gaseous medium from the upper interior portion of the apparatus and for discharging gaseous medium pumped thereby to a locality outside of the apparatus, which said gas-pumping means is relied upon for effecting and maintaining gaseous medium within the tank at sub-atmospheric pressure sufficiently low to insure the surface level of the ever-changing body of liquid being at elevation sufficiently high for the passing of floating matter at the top of said body over the over-pass edge into the trough; a second pumping means; means providing suction passageway leading to said second pumping means from an upper interior gas-holding portion of the apparatus; and means providing discharge passageway leading from said second pumping means and having a terminal section for delivering gaseous medium pumped thereby into the draft tube.

26. Apparatus for performing a continuous process for separating and removing suspended matter from a liquid-solids suspension, which apparatus comprises a closed tank providing within the upper interior portion thereof a section for holding a gaseous medium at sub-atmospheric pressure and providing within the lower interior portion thereof a section for holding an ever-changing body of such liquid undergoing treatment constantly exposed to said overlying gaseous medium; a trough, an over-pass edge for the trough over which floating material from the body of liquid undergoing treatment must pass preparatory to being received into the trough and whose elevation is substantially higher than that of the bottom of said tank but substantially lower than that of the uppermost interior portion of the top of the tank; a basin outside of said tank for holding under atmospheric pressure conditions feed liquid containing solids suspended therein; a draft tube having an intake end submerged within the liquid within the basin and a discharge end within the tank but located above the bottom of the tank at an elevation lower than that of said overpass edge; an effluent receiver outside of the tank for holding therein a maintained body of liquid; conduit means leading from a lower interior portion of the tank having a barometric leg extending into said receiver so that the discharge end thereof is constantly submerged in the liquid within said receiver; a collector located outside of the tank for holding therein a maintained body of sealing liquid; conduit means having a barometric leg leading from said trough extending into said collector so that the discharge end thereof is constantly submerged in the liquid within said collector; gas pumping means for removing gaseous medium from the upper interior portion of the apparatus and for discharging gaseous medium pumped thereby to a locality outside of the apparatus, which said gas-pumping means is relied upon for effecting and maintaining gaseous medium within the tank at subatmospheric pressure sufficiently low to insure the surface level of the ever-changing body of liquid being at elevation sufficiently high for the passing of floating matter at the top of said body over the over-pass edge into the trough; and a second pumping means; means providing a suction passageway leading to said second pumping means from a liquid-holding portion of said apparatus of which the liquid therein is exposed to the overlying gaseous medium at sub-atmospheric pressure; and means providing a discharge passageway leading from said second pumping means and disposed for delivering pumped liquid into the draft tube for promulgating a flow of liquid-solids mixture within the draft tube toward the discharge end thereof.

27. Apparatus for separating and removing suspended matter from a liquid-solids suspension, which apparatus comprises a closed tank providing within the upper interior portion thereof a section for holding a gaseous medium at sub-atmospheric pressure and providing within the lower interior portion thereof a separating section for holding an ever-changing body of such liquid undergoing treatment that is constantly exposed to said overlying gaseous medium; a trough, an over-pass edge for the trough over which floated material from the body of liquid undergoing treatment must pass preparatory to being received into the trough, the elevation of which over-pass edge is substantially higher than that of the bottom of said tank but substantially lower than that of the uppermost interior portion of the top of the tank; a basin outside of said tank for holding under atmospheric pressure conditions feed liquid containing solids suspended therein; a draft tube having an intake end submerged within the liquid within said basin and a rising terminal section providing a discharge end located within the tank above the bottom of the tank and disposed at elevation lower than that of said over-pass transfer edge; an effluent receiver outside of the tank for holding therein a maintained body of clarified liquid; effluent-transfer means comprising a compartment, effluent-overflow means functionally dividing the compartment into an upflow-effluent receiving portion and an overflowed-effluent receiving portion and whose overflow elevation is lower than that of the uppermost interior portion of the compartment but proximate that of said over-pass edge, conduit means leading upwardly from a lower interior portion of the tank to said upflow-effluent receiving portion, and conduit means providing a barometric leg leading from said overflowed-effluent receiving portion into said effluent receiver so that the discharge end thereof is constantly submerged in the liquid within said receiver; a collector outside of the tank for holding therein a maintained body of sealing liquid; conduit means providing a barometric leg extending downwardly from said trough into said collector so that the discharge end thereof is constantly submerged in the liquid within said collector; means providing constant gas communication between the upper interior portion of the closed tank and the upper interior portion of the compartment; gas-pumping means for removing gaseous medium from an upper interior gas-holding portion of the apparatus and for discharging gaseous medium pumped thereby to a locality outside of the apparatus, which said gas-pumping means is relied upon for effecting and maintaining gaseous medium within the tank at sub-atmospheric pressure sufficiently low to insure the surface level of the ever-changing body of liquid being at elevation sufficiently high for the passing of floating matter at the top of said body over the over-pass edge into the trough; a second pumping means; means providing a suction passageway leading to the second pumping means from an upper interior gas-holding portion of the apparatus; means providing a discharge passageway leading from the pump, and a distributing jet member therefor for directly influencing the movement of floating material towards and past the over-pass edge.

28. Apparatus comprising a closed tank wherein there is normally maintained an ever-changing body of liquid directly exposed to an overlying gaseous medium; pumping means for sucking gaseous medium from the apparatus for maintaining gaseous medium remaining in the tank at sub-atmospheric pressure; feed-supply means having a discharge section delivering gas-bearing liquid suspension containing floatable matter into the tank at feed discharge elevation intermediate the top and bottom of the tank and means for minimizing air leakage into said feed-supply means; a trough open to the gaseous medium within the tank, an over-pass edge for the trough at elevation higher than said feed discharge elevation but lower than the top of the tank over which edge floating material on said body must pass before receipt in said trough; discharge means for passing floating material from said trough to outside the apparatus and means for minimizing air leakage into said discharge means; effluent-outflow means leading from the interior portion of the tank at elevation lower than said feed discharge elevation to outside the apparatus and means for minimizing air leakage into said effluent-outflow means; said apparatus being characterized in that it includes a second pumping means disposed in a liquid-conducting circuit whereby it receives liquid derived from a liquid-holding portion of the tank that is at elevation lower than that whereat feed material is delivered from the discharge section of the feed-supply means and from which said second pumping means the liquid passed thereinto is forcibly delivered into a portion of said feed-supply means for furthering the forward passage of the feed material upwardly within the discharge section of said feed-supply means.

EDWIN A. PACKARD.